United States Patent
Brückner et al.

(10) Patent No.: US 7,818,463 B2
(45) Date of Patent: Oct. 19, 2010

(54) METHOD FOR PROCESSING CONSISTENT DATA SETS BY AN ASYNCHRONOUS APPLICATION OF A SUBSCRIBER IN AN ISOCHRONOUS, CYCLICAL COMMUNICATIONS SYSTEM

(75) Inventors: Dieter Brückner, Unterleiterbach (DE); Franz-Josef Götz, Heideck (DE); Dieter Klotz, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/998,397

(22) Filed: Nov. 29, 2007

(65) Prior Publication Data

US 2008/0091850 A1 Apr. 17, 2008

Related U.S. Application Data

(63) Continuation of application No. 10/489,760, filed as application No. PCT/DE02/03521 on Sep. 19, 2002, now Pat. No. 7,320,039.

(30) Foreign Application Priority Data

Sep. 26, 2001 (DE) ................. 101 47 423
Jul. 4, 2002 (DE) ................. 102 30 127

(51) Int. Cl.
*G06F 3/00* (2006.01)
*G06F 13/28* (2006.01)
*G06F 17/00* (2006.01)
*G06F 5/00* (2006.01)
*G06F 7/00* (2006.01)

(52) U.S. Cl. ................. 710/1; 710/20; 710/21; 710/52; 710/53; 707/609; 707/610

(58) Field of Classification Search .............. 710/1, 710/20–21, 52–53; 707/8, 609–610
See application file for complete search history.

(56) References Cited

U.S. PATENT DOCUMENTS

| | | | |
|---|---|---|---|
| 5,327,428 A | 7/1994 | Van As et al. | |
| 5,604,742 A | 2/1997 | Colmant et al. | |
| 5,841,771 A | 11/1998 | Irwin et al. | |
| 6,088,744 A | 7/2000 | Hill | |
| 6,181,694 B1 | 1/2001 | Pickett | |
| 6,324,581 B1 * | 11/2001 | Xu et al. | 709/229 |
| 6,490,676 B1 | 12/2002 | Cota-Robles | |
| 6,603,625 B1 | 8/2003 | Hospodor et al. | |
| 6,651,139 B1 | 11/2003 | Ozeki et al. | |
| 6,691,198 B1 | 2/2004 | Hamlin | |
| 6,744,772 B1 | 6/2004 | Eneboe et al. | |
| 6,847,650 B1 | 1/2005 | Stone et al. | |
| 6,904,475 B1 | 6/2005 | Fairman | |
| 6,973,455 B1 * | 12/2005 | Vahalia et al. | 707/8 |
| 2002/0004799 A1 * | 1/2002 | Gorelik et al. | 707/201 |
| 2002/0184170 A1 * | 12/2002 | Gilbert et al. | 706/20 |

FOREIGN PATENT DOCUMENTS

| | | |
|---|---|---|
| DE | 42 07 158 A1 | 10/1992 |
| DE | 199 28 939 A1 | 1/2001 |
| EP | 1 093 252 A2 | 4/2001 |

* cited by examiner

*Primary Examiner*—Alford W Kindred
*Assistant Examiner*—Chun-Kuan Lee (57) ABSTRACT

A processing of consistent data sets by asynchronous application of a subscriber in an isochronous, cyclical communication system is provided. Accordingly, by connecting a communication memory and a consistency, transmission and reception buffer, copying processes leading delay can be kept to a minimum.

16 Claims, 6 Drawing Sheets

| Status | | | |
|---|---|---|---|
| Write access by the application | ▨ | | |
| Copying of data from AB B to SP | ▨ | | |
| Copying from DS B into AB B | | ▩ | |
| Receiving data | ▨ | ▨ | ▨ |
| Sending data | ▨ | ▨ | ▨ |
| Time interval | 1 | 2 | 3 |

FIG 9

METHOD FOR PROCESSING CONSISTENT DATA SETS BY AN ASYNCHRONOUS APPLICATION OF A SUBSCRIBER IN AN ISOCHRONOUS, CYCLICAL COMMUNICATIONS SYSTEM

CROSS REFERENCE TO RELATED APPLICATIONS

This application is a continuation of U.S. application Ser. No. 10/489,760 filed Mar. 16, 2004 now U.S. Pat. No. 7,320, 039, and claims the benefit of the U.S. National Stage of International Application No. PCT/DE02/03521 filed Sep. 19, 2002. The International Application claims the benefits of German Patent Application No. 10147423.7 DE filed Sep. 26, 2001, and of German Patent Application No. 10230127.1 DE filed Jul. 4, 2002. All of the applications are incorporated by reference herein in their entirety.

FIELD OF INVENTION

The invention relates to a method for processing consistent data sets by an asynchronous application of a subscriber in an isochronous, cyclical communications system.

BACKGROUND OF INVENTION

Data networks are formed from a number of network nodes and allow communication between a number of subscribers. Communication here means the transmission of data between the subscribers. The data to be transmitted in this case is sent as data telegrams, which means that the data is packed into one or more packets and sent in this form over the data network to the appropriate recipient. The term data packet is thus used. The term transmission of data is used in this document fully synonymously with the above-mentioned transmission of data telegrams or data packets.

For networking in switchable high-performance data networks for example, especially Ethernet, the subscribers are interlinked via coupling nodes. Each coupling node can be connected to more than two subscribers and can also be a subscriber itself. Subscribers are for example computers, Programmable Logic Controllers (PLC) or other machines which exchange electronic data with other machines and especially process it.

In distributed automation systems, for example in the area of drive technology, specific data must arrive at specific times at the intended subscribers and must be processed by the recipients. This is referred to as realtime-critical data or realtime-critical data traffic since if the data does not arrive at its intended destination at the right time this can produce undesired results at the subscriber.

Similarly the use of an isochronous, cyclical communication system is known from the prior art. This is taken to mean a system consisting of at least two subscribers that are linked via a data network for the purposes of mutual exchange of data or mutual transmission of data. In this case data is exchanged cyclically in equidistant communication cycles which are specified by the communication clock used by the system. Subscribers, such as central automation devices, Programmable Logic Controllers, controls, checking units, computers, machines that exchange electronic data with other machines, drives, actors or sensors, execute specific applications. In this document control units are taken to mean closed-loop controllers or control units of all types. Typical examples of communication systems used for data transmission are bus systems such as Field Bus, PROFIBUS, Ethernet, Industrial Ethernet, FIREWIRE or also PC-internal bus systems (PCI), etc. In such systems data telegrams are fed into the data network at fixed points for transmission by a subscriber.

For synchronous applications the processing of the data is synchronized with the communication cycle. By contrast the processing of data in asynchronous applications is not synchronized with the communication cycle. This reading and writing of data by an asynchronous application can occur at any point in time. This produces special requirements for inclusion of an asynchronous application into an isochronous, cyclical communication system. Basically consistent data is to be sent and read by a subscriber. Consistent data is data which relates to the same time interval. Subscribers with asynchronous applications known from the prior art have the consistency buffer and a communication memory. If the application is to process data from a specific address range in the communication memory, this data is first copied into the consistency buffer.

Only then does the application access the data in the consistency buffer to read it. All addresses in the communication memory can thus be overridden while the application works with the consistent data in the consistency buffer.

The application first writes data into the consistency buffer while consistent data can be sent at the same time from the communication memory to further subscribers. After write access by the application and the sending of data has ended the data written in this way is copied from a consistency buffer to the communications memory. The consistent data is stored here for onwards transmission. The copying processes lead to delays in such cases.

Figure 1:
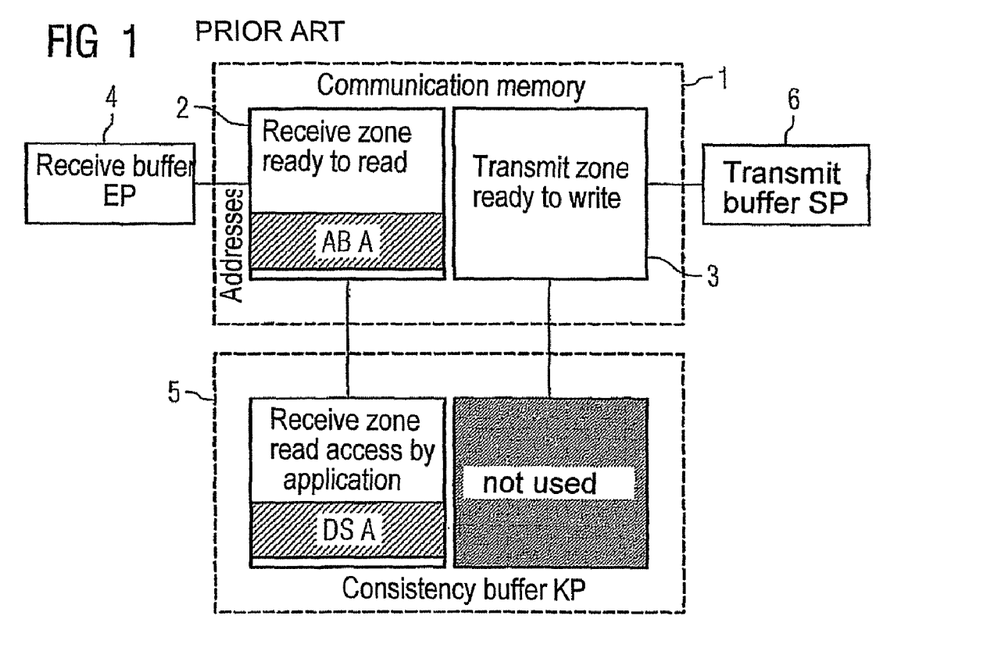
FIG. 1 a block diagram of a system from the prior art during a read access

FIG. 1 illustrates a system from the prior art for processing consistent data blocks during read access. The communications memory 1 has a receive zone 2 and a transmit zone 3. The receive zone 2 is linked to the receive buffer 4 and the consistency buffer 5. The transmit zone 3 is linked to the consistency buffer 5 and the transmit buffer 6. Data set DS A from address range AB A to which the application has access for reading is located in the consistency buffer.

Figure 2:
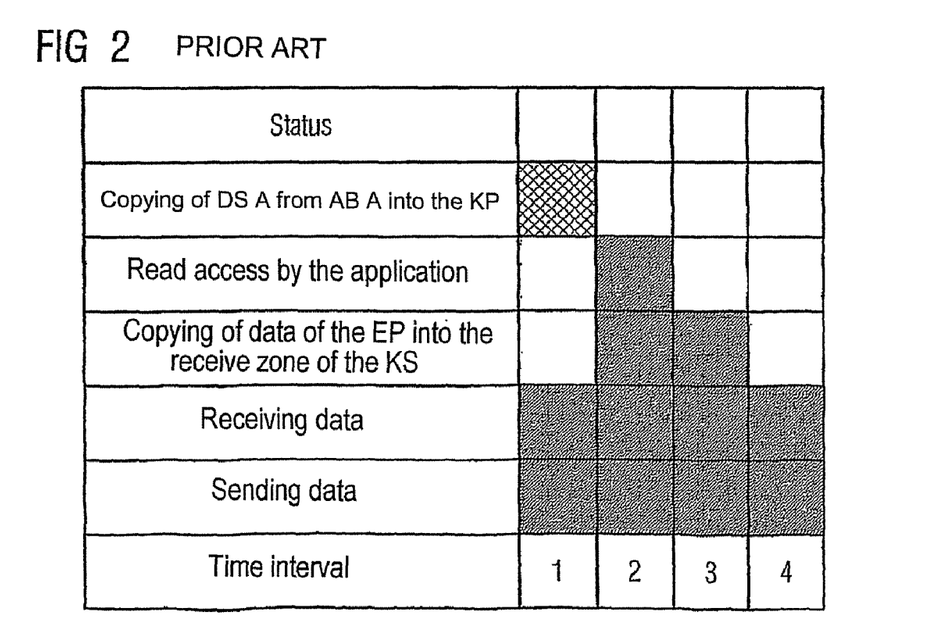
FIG. 2 a state transition diagram during read access in accordance with the prior art, FIG. 3 a block diagram or a system from the prior art during a write access, FIG. 4 a state transition diagram during write access in accordance with the prior art, FIG. 5 a block diagram of a system in accordance with the invention during a read access FIG. 6 a state transition diagram during a read access in accordance with the invention, FIG. 7 a block diagram of a system in accordance with the invention during a write access, FIG. 8 a state transition diagram during a write access in accordance with the invention, FIG. 9 a flowchart of read access in accordance with the invention, FIG. 10 a flowchart of write access in accordance with the invention.

FIG. 2 illustrates the sequence of read access by the application in the system shown in FIG. 1 Before read access the data set DS A is copied from the receive zone 2 of the communication memory 1 to the consistency buffer 5. Data set DS A is data which can be or could be accessed by the application during a read access. Data set DS A is to be consistent during a read access and originates from the address range AB A in the receive zone 2 of communication memory 1.

Because the data of the consistency block requested by the application is saved in the consistency buffer, newly received data of receive buffer 4 which lies in the address range of the consistency block can subsequently be stored in the receive zone 2 of communication memory 1. Read access by the application to the data set DS A in the consistency buffer 5 takes place independently of this storage process. During the read access files can be copied from the receive buffer 4 into the receive zone 2 of communication memory 1.

Figure 3:
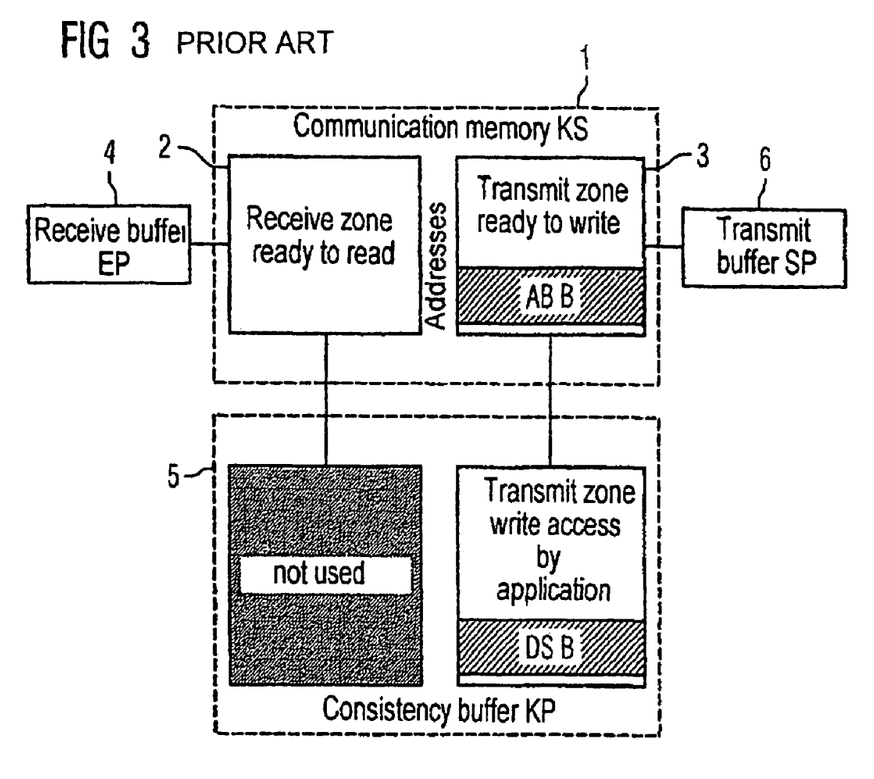

FIG. 3 shows the system from FIG. 1 during a write access by the application.

Figure 4:
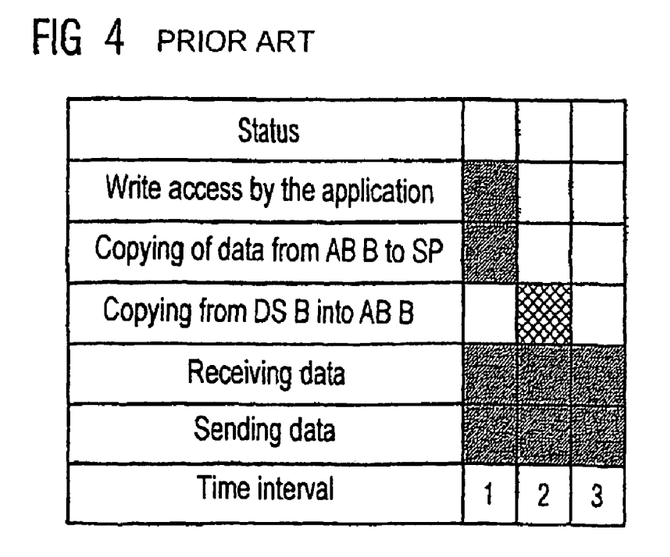

FIG. 4 illustrates the sequence of a write access by the application. While the application is writing data set DS B into the consistency buffer 5 data is forwarded from the transmit zone 3 of the communication memory 1 to the transmit buffer 6. Data set DS B is to be copied into a specific address range AB B of the transmit zone 5 of the communication memory 1. Before this copying process takes place all data from the address range AB B which is to move during a copying process from the transmit zone 3 to the transmit buffer 6 should be forwarded to the transmit buffer 6. The data set DS B can thus only be copied from the consistency buffer 5 into the transmit zone 3 of the communication memory 1 once both the write access and the forwarding of data from the address range B are completed.

SUMMARY OF INVENTION

An object of the invention is thus to minimize delays which can arise as a result of the necessary copying processes at a subscriber with an asynchronous application into an isochronous cyclical communications system.

The object of the invention is achieved by a method, a subscriber and an isochronous, cyclical communication system as claimed in the claims. Preferred embodiments of the invention are specified in the dependent patent claims.

With the method in accordance with the invention, before it can be read in the asynchronous application, data is advantageously not copied into the consistency buffer. The application accesses the communication memory directly to read the data. During read access data which is destined for an address range in the communication memory to which the application has access or could have access is copied from the receive buffer into the consistency buffer. Only this data will be copied from the consistency buffer to the communication memory at the end of the reader access. A copying process is only needed if data is received during read access from the receive buffer which is addressed to an address range to which the application has access or could have access.

In a further method in accordance with the invention the application writes data directly into the communication memory. Data from an address range to which the application has access or could have access during writing is written into the consistency buffer before write access. Here it is ready for transmission while if the application is writing data to the communication memory. It is advantageous that the forwarding of the data from the consistency buffer to the transmit buffer can be interrupted as soon as write access to the reserved address range has been ended and instead current data can be forwarded from the communication memory to the transmit buffer.

BRIEF DESCRIPTION OF THE DRAWINGS

A preferred exemplary embodiment of the invention is explained in more detail below with reference to the diagrams. The drawings show.

DETAILED DESCRIPTION OF INVENTION

Figure 5:
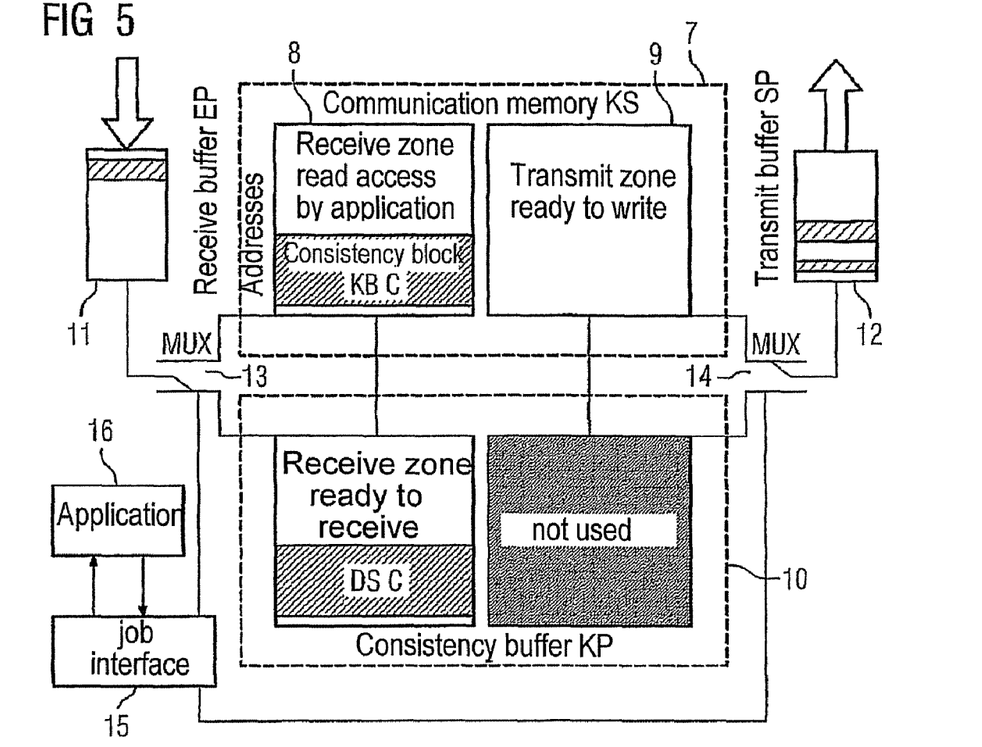

FIG. 5 shows a system in accordance with the invention of a subscriber of an isochronous, cyclical communication system for processing consistent data blocks during a read access. The system in accordance with the invention also possesses a communication memory 7 with a receive zone 8 and a transmit zone 9, a consistency buffer 10, a receive buffer 11 and a transmit buffer 12. The system in accordance with the invention differs significantly from the prior art by linking of the receive buffer 11 and the transmit buffer 12 with the communication memory 7 and the consistency buffer 10. Using the multiplexer 13 a link can be established between both the receive buffer 11 and the consistency buffer 10 and also between the receive buffer 11 and the communication memory 7. Likewise by means of multiplexer 14 an alternative link between the transmit buffer 12 and the communication memory 7 or the consistency buffer 10 can be established. The job interface 15 controls the multiplexers 13 and 14.

In the case shown the application 16 reads data from the address range AB C of the consistency block KB C in the receive zone 8 of the communication memory 7, while data set DS C is being forwarded from receive buffer 11 to consistency buffer 10 which is actually intended for address range AB C. To ensure the consistency of the data read by the application, the data set DS C will thus be copied into the consistency buffer. The job interface 15 controls the multiplexer 13 so that there is a connection between the receive buffer 11 and the consistency buffer 10. The read access has no effect on the forwarding of data from the transmit zone 9 to the transmit buffer 12. The transmit zone 9 is thus connected via the multiplexer 14 to the transmit buffer 12.

The use of the consistency buffer 10 during read access is thus only necessary because the data set DS C is destined for address range AB C to which the application 16 has access or could have access. Otherwise the data can be forwarded directly from the receive buffer 11 to the receive zone 8 of the communication memory 7. The job interface 15 will then establish a connection between at the receive buffer 11 and the receive zone 8.

Figure 6:
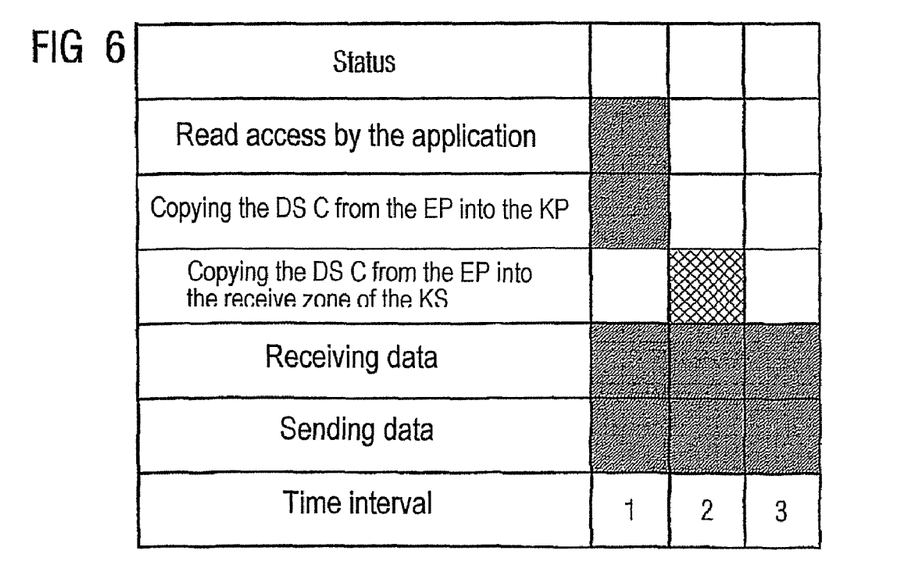

FIG. 6 illustrates the sequence of read access in accordance with the invention. During read access by the application to the receive zone 8 of the communication memory 7 a data set DS C which is destined for the address range AB C of the consistency block KB C is copied from the receive buffer 11 to the consistency buffer 10. After read access has ended the data set DS C will be copied from the consistency buffer 10 into the receive zone 8 of the communication memory 7. Data is sent and received independently of the read access.

Figure 7:
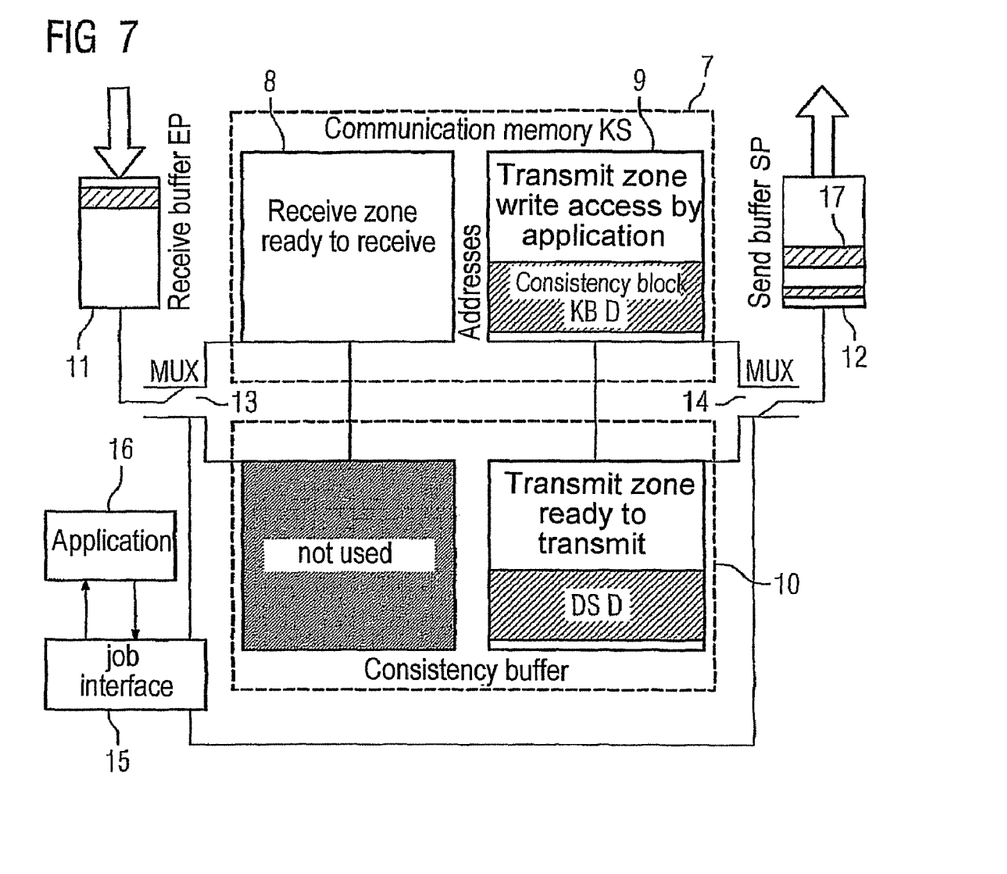

FIG. 7 shows the system from FIG. 5 during a write access. The address range of the consistency block KB D will be written by application 16 directly in the transmit zone 9 of the communication memory 7. The data set DS D from the address range of the consistency block KB D is located in the consistency buffer 10. It is advantageous that in transmit buffer 12 a complete set of data 17 is "in stock" for transmission. In stock here means that the set includes all data which is to be transmitted during the next transmit procedure.

Figure 8:
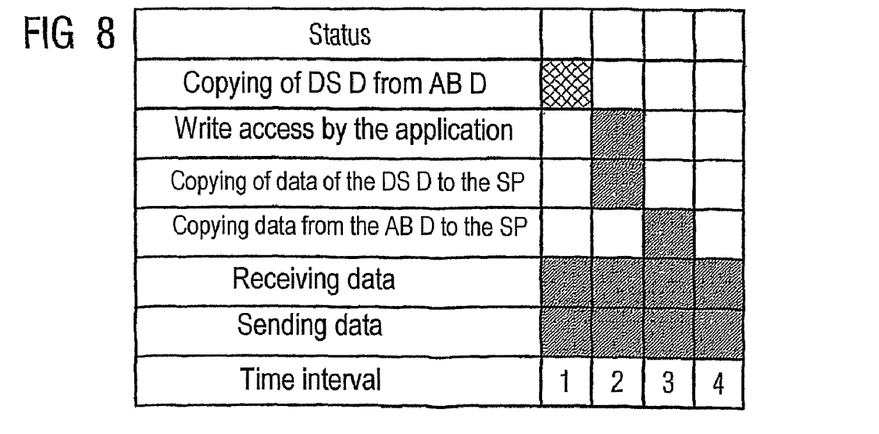

FIG. 8 illustrates the sequence of a write access in accordance with the invention in the system of FIG. 7. Before write access by application 16 the data set DS D will be copied from the address range AB D of the consistency block KB D which the application can or could write to during the write access from the transmit zone 9 of the communication memory 7 to the consistency buffer 10. During write access consistent data can be transmitted from a data set DS D from the consistency buffer 10 to the transmit buffer 12. The job interface 15 therefore connects the consistency buffer 10 with the transmit buffer 12.

If write access by the application 16 is ended before the ending of the copying process of data set DS D from the consistency buffer 10 to the transmit buffer 12 the copying process will be aborted. To guarantee the transmission of a complete data set from the transmit buffer 12 a data set 17 must therefore be kept in stock in this.

After the write access data can be forwarded from the address range AB D again and from the transmit zone 9 of the communication memory 7 to the transmit buffer 12. Data which is not located in address range AB D can also be forwarded during write access from the receive zone 9 of the communication memory 9 to the transmit buffer 12. Data can be received independently of write access at the receive port and sent at the transmit buffer 12.

Figure 9:
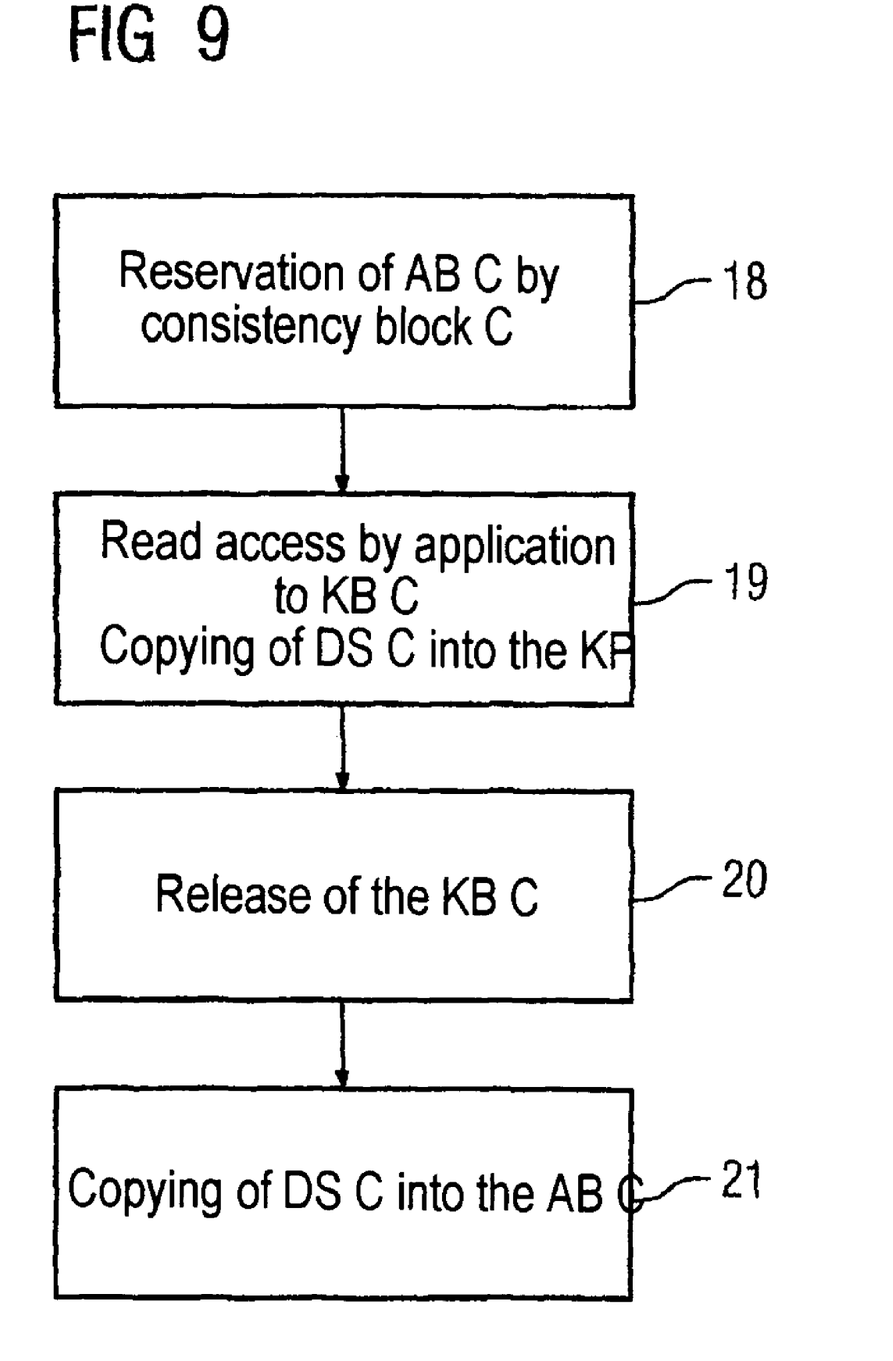

FIG. 9 shows a flowchart of a read access in accordance with the invention. First of all an address range AB C in the receive zone of the communication memory is reserved by a consistency block KB C (step 18). "Reservation by a consistency block" means in this connection that data can neither be copied from the receive buffer into the address range occupied by a consistency block, nor from an address range occupied by a consistency block into the transmit buffer. The address range AB C includes addresses to which the application has access or could have access during a read access.

In the next step (step 19) the application accesses the consistency block KB C in the communication memory for reading. At the same time the data set DS C which is addressed to addresses in the address range AB C of the consistency block KB C is copied from the receive buffer to the consistency buffer.

After the end of read access the consistency block KB C is released (step 20). The address range AB C can now be written again with data from the receive buffer.

Data which was written during the read access into the consistency buffer can finally be copied into the address range AB C of the communication memory (step 21).

Figure 10:
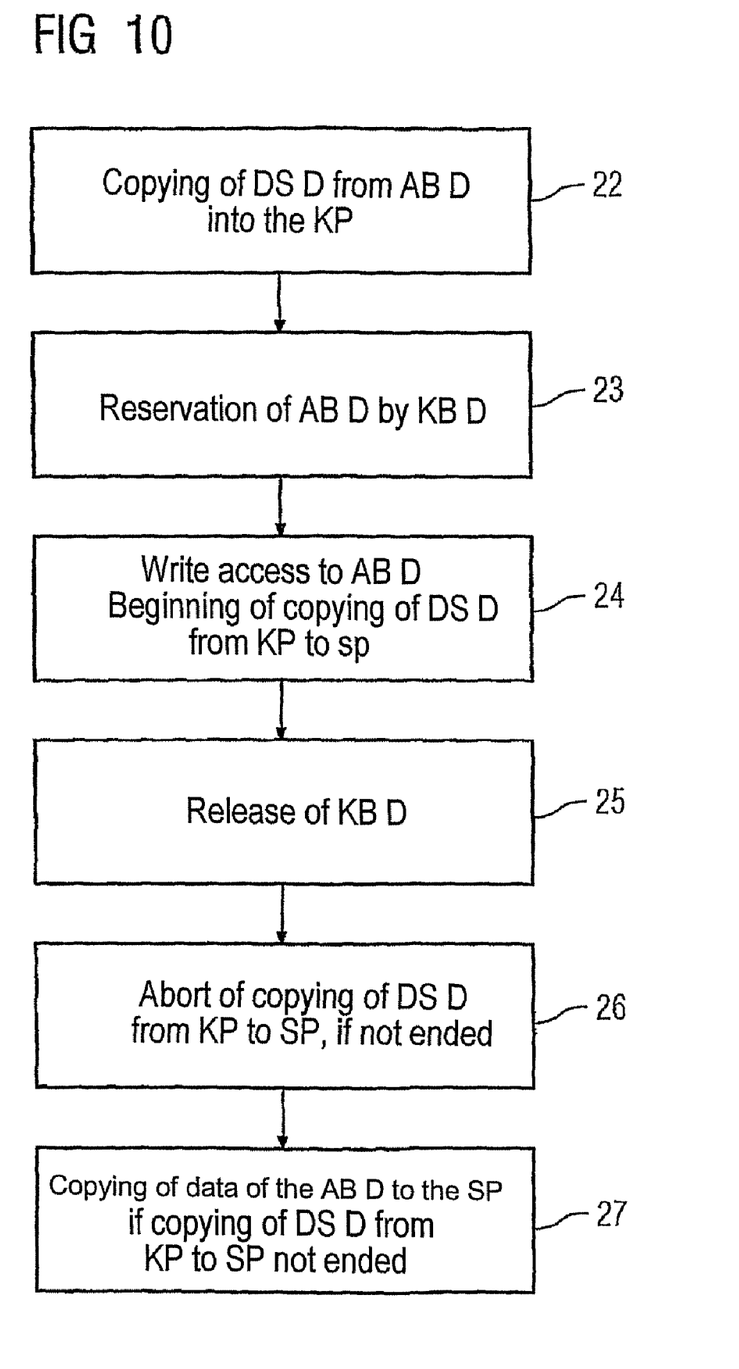

FIG. 10 shows a flowchart of a write access in accordance with the invention. A data set DS D in address range AB D of the transmit zone 9 of the communication memory which is written or could be written by the application during a write access will first be copied into the consistency buffer (step 22).

The address range AB D will then be occupied by the consistency block KB D (step 23). Thus data can no longer be forwarded from the address range AB D to the transmit buffer.

During the write access however data of the data set DS D can be forwarded from the consistency buffer to the transmit buffer (step 24).

After write access has ended the consistency block KB D will be released (step 25). Data can again be forwarded from the address range AB D to the transmit buffer.

The copying process of data of data set DS D from the consistency buffer to the transmit buffer will be aborted if it is not completed before the end of write access (step 26) and replaced by the current data from the communication memory.

A current data record is then copied from the address range AB D of the consistency block KB D to the transmit buffer (step 27).

The invention claimed is:

1. A method for minimizing delay while processing consistent data blocks in an isochronous, cyclical communications system by an asynchronous application of a subscriber having access to data in a communication memory of the cyclical communication system, wherein the cyclical communications system receives incoming data into a receive buffer and continuously copies the incoming data into the communication memory at a destination address range for the incoming data, and wherein the cyclical communications system receives outgoing data into a transmit buffer from a transmit zone of the communication memory during write access, the method comprising:

(a) during read access by the asynchronous application,
  (i) designating a consistency block of data by reserving in the communication memory the destination address range to be read by the asynchronous application, whereby once the destination address range is reserved, the incoming data from the receive buffer destined for the reserved destination address range can no longer be copied into the reserved destination address range, thereby keeping the consistency block of data consistent during the read process;
  (ii) when there is a data set DS in the receive buffer destined for the reserved destination address range in the communication memory during read access, redirecting the data set DS of the incoming data to a consistency buffer by switching a data connection between the receive buffer and the communication memory to the consistency buffer so that the data set DS is now copied from the receive buffer to the consistency buffer rather than to the communication memory; and
  (iii) reading the consistency block of data in the reserved destination address range directly from the communication memory by the asynchronous application, thereby minimizing any delay that would have arose if the consistency block of data was first copied into another location; and (b) after read access by the asynchronous application is complete,
  (i) releasing the reserved destination address range in the communication memory; and
  (ii) when the data set DS was redirected in step (a)(ii), copying only the redirected data set DS back to the previously reserved destination address range in the communication memory; and (c) before the write access of a second address range in the transmit zone of the communication memory to be written into by the asynchronous application, copying a second block of data in the second address range in the transmit zone in the communication memory to the consistency buffer and designating a second consistency block of data at the second address range;

(d) during the write access by the asynchronous application, writing to the second consistency block of data at the second address range in the transmit zone in the communication memory by the asynchronous application; and copying the second block of data from the consistency buffer into the transmit buffer as the outgoing data by switching a second data connection between the transmit buffer and the communication memory to the consistency buffer so that the outgoing data is now received by the transmit buffer from the consistency buffer rather than from the transmit zone of the communication memory; and (e) after the write access by the asynchronous application is complete, releasing the second consistency block of data at the second address range in the transmit zone in the communication memory, wherein when the copying of the second block of data from the consistency buffer into the transmit buffer as the outgoing data is not finished before writing to the second consistency block of data in the communication memory is completed, aborting the copying of the second block of data from the consistency buffer into the transmit buffer as the outgoing data and copying the second consistency block of data at the second address range in the transmit zone in the communication memory as the outgoing data instead.

2. The method of claim 1 wherein redirecting the data set DS comprises using a multiplexer controlled by a job interface to switch the data connection between the receive buffer and the communication memory to the consistency buffer.

3. The method of claim 1 wherein steps (a)(i) through (a)(iii) are all completed in a single time interval of the cyclical communications system.

4. The method of claim 3 wherein steps (b)(i) through (b)(ii) are all completed in a subsequent single time interval of the cyclical communications system.

5. The method of claim 1 wherein the incoming data is continuously received into the receive buffer during each time interval of the cyclical communications system.

6. The method of claim 1 wherein the communication memory comprises a receive zone for storing the incoming data copied from the receive buffer.

7. The method of claim 1 wherein switching the second data connection between the transmit buffer and the communication memory to the consistency buffer comprises using a second multiplexer.

8. The method of claim 1 wherein steps (c) through (e) are each completed subsequent to each other in single time intervals of the cyclical communications system.

9. A system for minimizing delay while processing consistent data blocks in an isochronous, cyclical communications system by an asynchronous application of a subscriber, comprising:
   a receive buffer for receiving incoming data and continuously copying the incoming data into a communication memory at a destination address range for the incoming data;
   a transmit buffer for sending outgoing data;
   a first switching device for selectively connecting the receive buffer with the communication memory or with a consistency buffer,
   wherein the system is configured to:
   (a) during read access by the asynchronous application,
      (i) designate a consistency block of data by reserving in the communication memory the destination address range to be read by the asynchronous application, whereby once the destination address range is reserved, incoming data from the receive buffer destined for the reserved destination address range can no longer be copied into the reserved destination address range, thereby keeping the consistency block of data consistent during the read process;
      (ii) when there is a data set DS in the receive buffer destined for the reserved destination address range in the communication memory during read access, redirect the data set DS of the incoming data to the consistency buffer by switching a data connection between the receive buffer and the communication memory to the consistency buffer so that the data set DS is now copied from the receive buffer to the consistency buffer rather than to the communication memory; and
      (iii) read the consistency block of data in the reserved destination address range directly from the communication memory by the asynchronous application, thereby minimizing any delay that would have arose if the consistency block of data was first copied into another location; and
   (b) after read access by the asynchronous application is complete,
      (i) release the reserved destination address range in the communication memory; and
      (ii) when the data set DS was redirected in step (a)(ii), copy only the redirected data set DS back to the previously reserved destination address range in the communication memory;
   a second switching device for selectively connecting the transmit buffer with the communication memory or with the consistency buffer, wherein the system is configured for write access by the asynchronous application, wherein the cyclical communications system receives outgoing data into the transmit buffer from a transmit zone of the communication memory, by:
   (c) before the write access of a second address range in the transmit zone of the communication memory to be written into by the asynchronous application, copying a second block of data in the second address range in the transmit zone in the communication memory to the consistency buffer and designating a second consistency block of data at the second address range;
   (d) during the write access by the asynchronous application, writing to the second consistency block of data at the second address range in the transmit zone in the communication memory by the asynchronous application; and copying the second block of data from the consistency buffer into the transmit buffer as the outgoing data by switching a second data connection between the transmit buffer and the communication memory to the consistency buffer so that the outgoing data is now received by the transmit buffer from the consistency buffer rather than from the transmit zone of the communication memory; and
   (e) after the write access by the asynchronous application is complete, releasing the second consistency block of data at the second address range in the transmit zone in the communication memory,
   wherein when the copying of the second block of data from the consistency buffer into the transmit buffer as the outgoing data is not finished before writing to the second consistency block of data in the communication memory is completed, aborting the copying of the second block of data from the consistency buffer into the transmit buffer as the outgoing data and copying the second consistency block of data at the second address range in the transmit zone in the communication memory as the outgoing data instead.

10. The system of claim 9 wherein redirecting the data set DS comprises using a multiplexer controlled by a job interface to switch the data connection between the receive buffer and the communication memory to the consistency buffer.

11. The system of claim 9 wherein steps (a)(i) through (a)(iii) are all completed in a single time interval of the cyclical communications system.

12. The system of claim 11 wherein steps (b)(i) through (b)(ii) are all completed in a subsequent single time interval of the cyclical communications system.

13. The system of claim 9 wherein the incoming data is continuously received into the receive buffer during each time interval of the cyclical communications system.

14. The system of claim 9 wherein the communication memory comprises a receive zone for storing the incoming data copied from the receive buffer.

15. The system of claim 9 wherein switching a second data connection between the transmit buffer and the communication memory to the consistency buffer comprises using a second multiplexer.

16. The system of claim 9 wherein steps (c) through (e) are each completed subsequent to each other in single time intervals of the cyclical communications system.

* * * * *